US008646727B2

(12) United States Patent
Guering

(10) Patent No.: US 8,646,727 B2
(45) Date of Patent: Feb. 11, 2014

(54) AIRCRAFT HOLD AND AIRCRAFT EQUIPPED WITH SUCH A HOLD

(75) Inventor: Bernard Guering, Montrabe (FR)

(73) Assignee: Airbus Operations SAS, Toulouse (FR)

( * ) Notice: Subject to any disclaimer, the term of this patent is extended or adjusted under 35 U.S.C. 154(b) by 446 days.

(21) Appl. No.: 12/595,045

(22) PCT Filed: Jun. 13, 2008

(86) PCT No.: PCT/FR2008/000820
§ 371 (c)(1),
(2), (4) Date: Oct. 8, 2009

(87) PCT Pub. No.: WO2009/010648
PCT Pub. Date: Jan. 22, 2009

(65) Prior Publication Data
US 2010/0140396 A1 Jun. 10, 2010

(30) Foreign Application Priority Data

Jun. 15, 2007 (FR) ..................................... 07 04289

(51) Int. Cl.
*B64C 1/22* (2006.01)
(52) U.S. Cl.
USPC ....................................... 244/118.1; 296/24.4
(58) Field of Classification Search
USPC ............. 244/118.1, 131, 129.1, 129.4, 129.5, 244/118.5, 118.2; 296/24.43, 24.4, 24.41; 280/749; 220/1.5, 350
See application file for complete search history.

(56) References Cited

U.S. PATENT DOCUMENTS

| 2,674,207 | A | | 4/1954 | Kerbaugh et al. |
| 3,423,121 | A | * | 1/1969 | Lipkin .......................... 296/24.4 |
| 3,999,727 | A | | 12/1976 | Rennemann |
| 4,121,392 | A | * | 10/1978 | Plewacki .......................... 52/64 |
| 4,479,621 | A | | 10/1984 | Bergholz |
| 4,597,549 | A | * | 7/1986 | Ryan .......................... 244/118.5 |
| 5,540,402 | A | * | 7/1996 | Carducci .................... 244/118.1 |
| 6,152,400 | A | * | 11/2000 | Sankrithi et al. ........... 244/118.5 |
| 6,183,177 | B1 | * | 2/2001 | Dahlgren ..................... 410/100 |
| 6,364,389 | B1 | * | 4/2002 | Beigel .......................... 296/24.4 |
| 6,616,389 | B1 | * | 9/2003 | Ament et al. ................. 410/118 |
| 7,950,884 | B2 | * | 5/2011 | Thompson .................... 410/118 |
| 2007/0098516 | A1 | | 5/2007 | Loftis et al. |
| 2009/0159743 | A1 | | 6/2009 | Guering et al. |

FOREIGN PATENT DOCUMENTS

FR 2 867 726 9/2005

* cited by examiner

*Primary Examiner* — Timothy D Collins
*Assistant Examiner* — Brian O'Hara
(74) *Attorney, Agent, or Firm* — Oblon, Spivak, McClelland, Maier & Neustadt, L.L.P.

(57) ABSTRACT

A device for keeping objects, especially luggage, in an aircraft hold, the device including a flexible partition and at least one winding mechanism. The flexible partition is mounted on the winding mechanism such that it can be both wound onto the winding mechanism or unwound from the winding mechanism. The flexible partition includes an attaching mechanism that operates with a complementary mechanism to maintain the flexible partition in an unwound position.

12 Claims, 2 Drawing Sheets

AIRCRAFT HOLD AND AIRCRAFT EQUIPPED WITH SUCH A HOLD

Figure 1:
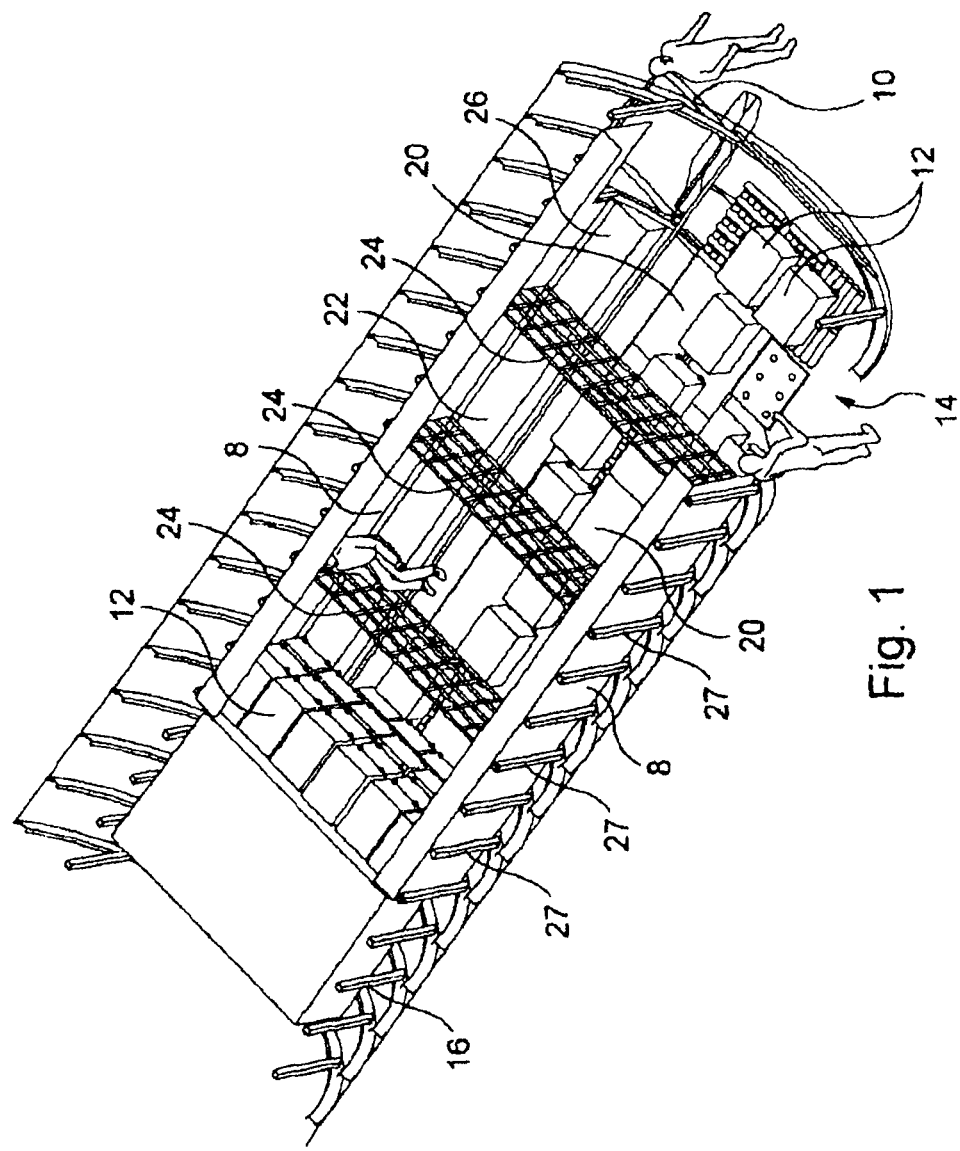

This invention relates to an aircraft hold, and more particularly a hold equipped with a holding device, intended in particular for baggage arranged in the said hold.

In an aircraft intended for the transport of passengers, the passengers carry a portion of their baggage along with them in the cabin of the aircraft, while the bulkier and heavier baggage travels in the hold. The latter baggage is transported to the aircraft with the aid of conveyors or on towed carts. There are conveyors making it possible to transport baggage to the door of the hold of the aircraft. Placement inside the hold usually is performed manually. An operator grasps the bag arriving in the hold and goes to put it away inside the latter. These operations for placing baggage in the hold are laborious. The hold is a relatively cramped space in which most of the time it is not possible to stand upright. Furthermore, certain bags can be heavy. The most difficult part is going to place the first bags at the back of the hold during loading of the baggage or else, during unloading of the baggage, going to look for the bags located at the back of the hold in order to remove them.

Another difficulty is the placement of the baggage in the hold. To limit the number of bags traveling in the cabin, the airline companies try to encourage the passengers to have their baggage travel in the hold. It then is advisable to plan for sufficient space in the hold to accommodate the baggage of all the passengers traveling on board the aircraft.

This invention then has as its purpose to provide an aircraft hold and a corresponding aircraft equipped with a device making it possible to optimize the loading of baggage into the said aircraft hold.

Advantageously, the optimization device is a device easy to use, occupying as little space as possible, in particular when it is not being used, and preferably light in weight so as not to disadvantage the overall mass of the aircraft.

To this end, this invention relates to an aircraft comprising:
- a hold having on the one hand a floor and on the other hand two side walls, and
- props extending more or less vertically behind the side walls resting on a primary structure of the aircraft for supporting a cabin floor.

According to the invention, the said aircraft furthermore comprises a holding device for objects, in particular baggage; the said device comprises a flexible wall and at least one winding mechanism; the flexible wall is mounted on the winding mechanism so as to be able to be either rolled up on the winding mechanism, or unrolled; hooking means are provided on the flexible wall to cooperate with complementary means for keeping the said flexible wall in unrolled position, and at least one winding mechanism of the holding device is mounted on one of the said props.

In this way, the hold is equipped with a holding device for baggage or the like with a flexible wall and at least one winding mechanism, and the winding mechanism is located outside the hold itself and therefore does not come to encroach on the loading space of the hold. In a preferred embodiment, slots are provided, for example, in the side walls facing each winding mechanism mounted on a prop so as to allow the passage of the corresponding flexible wall. To ensure the watertightness of the hold, there then can be provided a sheathing that surrounds each winding mechanism arranged on a prop so as to cover the said winding mechanism and ensure a watertightness around the latter.

Of course, the number of holding devices is adapted according to the size of the hold and of the space therein capable of accommodating baggage.

In one embodiment of the invention, the flexible wall is, for example, a net.

To facilitate the use of a holding device in an aircraft according to the invention, the flexible wall thereof preferably is made up of two flexible half-walls, each half-wall being rolled up on a winding mechanism, the two winding mechanisms being arranged parallel to one another. In this embodiment variant, it may be provided that one flexible half-wall bears hooking means at its free end and that the other flexible half-wall bears complementary hooking means at its free end.

Figure 3:
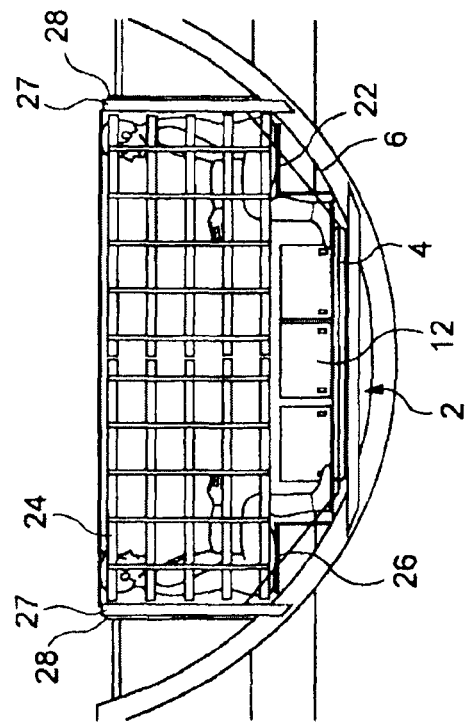
Figure 2:
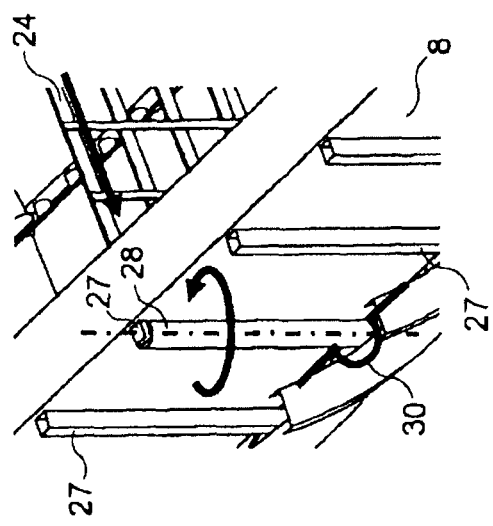

Details and advantages of this invention will emerge more clearly from the description that follows, given with reference to the attached schematic drawings on which:

FIG. 1 shows an aircraft hold according to this invention equipped with holding devices, FIG. 2 is a schematic view of a detail of a holding device, and FIG. 3 is a front schematic view of the hold of the aircraft of FIG. 1.

The description that follows is given with reference to an aircraft intended in particular for the transport of passengers. FIG. 1 shows a hold of such an aircraft.

A hold floor 2 is seen on FIGS. 1 and 3. This floor is made in three parts: a more or less horizontal central part 4 and two raised side parts 6, inclined in relation to the central part 4. Of course, the references to horizontality and verticality in this patent application relate to the aircraft described when it is on the ground.

The hold also has more or less vertical side walls 8 that delimit the loading space of the hold. The ceiling of the latter is not visible here.

The hold shown on FIG. 1 comprises as access, on the one hand a baggage door 10 intended in particular for the loading and unloading of baggage 12 and on the other hand a container door 14. The latter is of sufficient size to allow, for example, the passage of a standard type LD3 container 16.

The hold shown on FIG. 1 is equipped with a freight loading system, also known under the name of CLS (English abbreviations for Cargo Loading System). The latter is provided for the moving of containers 16 in the hold. These are loaded and unloaded through the container door 14. The freight loading system comprises in particular rollers on which the containers 16 moving in the hold come to slide. The rollers define a movement plane on which the containers 16 move. The latter are introduced into the hold through the container door 14 and pushed inside the hold. The freight loading system makes it possible to easily move the containers 16 toward the back of the hold in order to allow the introduction of other containers 16. Locking systems, not shown, make it possible to keep the containers 16 at the back of the hold during a flight. Such loading and locking systems are known to the individual skilled in the art and are not described in greater detail here.

In the example of FIG. 1, a container 16 is located at the back of the hold and the rest of the hold is intended to accommodate baggage 12. For loading of the hold, the baggage 12 is introduced into the hold, for example, through the baggage door 10. Innovative means then are provided for guiding this baggage 12 toward the back of the hold.

The means used here comprise two identical sets of conveyor belts 20. The conveyor belts 20 of one set are aligned one behind the other in the longitudinal direction of the aircraft on the central part 4 of the floor 2 of the hold. Between the two sets of conveyor belts 20 there is a row of rollers of the freight loading system.

These conveyor belts 20 each make it possible to move longitudinally in the hold of the aircraft one (or more) bags 12 placed thereon. A set of conveyor belts 20 thus makes it possible to move a bag 12 from the first conveyor belt located closest to the baggage door 10 to the last conveyor belt located at the other end of the set of conveyor belts, going from one conveyor belt 20 to the other.

It thus is provided to place the baggage 12 on the first conveyor belt of each of the sets of conveyor belts 20. This baggage 12 then is guided to the back of the hold. An operator located at the back of the hold then arranges the baggage that he receives to form a wall of baggage, as shown on FIG. 1. One operator per set of conveyor belts 20 preferably is provided.

In order to facilitate the task of the operators placing the baggage at the back of the hold, benches 22 are provided at the inclined side parts 6 of the floor 2. These benches preferably are pliable so as not to hamper the passage of containers 16. These benches 22 also can be used to support baggage 12. As a matter of fact, instead of having the baggage 12 rest on the inclined parts of the floor 2 of the hold, this baggage is placed on benches 22 that preferably have a base 26 more or less horizontal and parallel to the central part 4 of the floor 2 of the hold. In that way, the baggage stack created is more stable.

The conveyor belts 20 can be controlled individually. Thus on FIG. 1, the conveyor belt located farthest to the back of the hold of each set of conveyor belts and on which a wall of baggage 12 is located preferably is stopped. In this way, rubbing between the said conveyor belts and the baggage located at the bottom of the wall of baggage is avoided.

As the loading proceeds, the baggage forms walls of baggage. In order to secure this baggage and prevent it from falling over, it is provided to hang nets 24 crosswise in relation to the hold. These nets 24 preferably are rolled up on props 27 located at the side walls 8. These props 27 connect the floor of a cabin located above the hold to a primary structure of the aircraft. On FIG. 1 there are seen sections of components (generally called "framework" or "frame") of this primary structure on which the props 27 come to rest.

Each net 24 preferably is arranged at two props 27 corresponding to the same framework of the primary structure of the aircraft. A winding mechanism then is mounted on the two corresponding props 27. A slot implemented in the corresponding side wall 8 facing a prop 27 allows passage of the net 24. A sheathing not shown is provided around the winding mechanism to achieve watertightness around the latter and thus to ensure the continuity of the side wall. Each winding mechanism accommodates, for example, a half-net. These half-nets then are pulled by the operators from each winding mechanism and meet at the center of the hold and are hooked to one another with the aid of hooks or other joining devices, such as, for example, systems with hooks and loops known more generally under the brand name Velcro.

FIG. 2 shows in greater detail a winding mechanism 28 mounted on a prop 27. The winding mechanism 28 is located outside the hold and therefore absolutely does not hamper the loading of the latter. The sheathing referred to above is symbolized on FIG. 2 by a line 30 that represents the section of this sheathing. Only the section of the sheathing has been shown here in order not to conceal the rest of the structure. This sheathing here ensures watertightness around the winding mechanism 28 just as the side wall 8 ensures watertightness of the hold. It is made, for example, of the same material as the side wall 8. If the material used can be welded, the sheathing then, for example, is welded onto the corresponding side wall 8.

FIG. 3 shows the net 24 in a front view. The separation between the two half-nets is seen at the center. On this Figure, the benches 22 are in their usage position. The base 26 of each bench 22 is more or less horizontal or, expressed differently, more or less parallel to the central part 4 of the floor 2 of the hold. This base 26 then is used on the one hand to allow the operator (or operators) handling the baggage to sit down, and on the other hand to accommodate baggage.

As emerges from the preceding description, the baggage holding device according to the invention makes it possible to optimize the loading of baggage into an aircraft hold. The baggage can be stacked in the hold and held as the loading of the hold progresses.

Of course, this invention is not limited to the preferred embodiment described above by way of non-limitative example. It also relates to all the embodiment variants within the capacity of the individual skilled in the art in the context of the claims below.

Thus for example, instead of using a net to hold the baggage, other types of flexible walls could be used.

Furthermore, the preferred embodiment described provides for two half-walls (nets) each rolled up on a winding mechanism. One flexible wall the length of which corresponds more or less to the width of the hold also could be considered.

Finally, this invention is described in combination with conveyor belts and side benches. It also can be applied in a hold of the prior art, not equipped with these innovative arrangements.

The invention claimed is:

1. An aircraft comprising:
   a hold including a floor and two side walls, each of the side walls extending parallel to a longitudinal direction of the aircraft and having a first side and a second side, the first sides of the side walls facing each other and the second sides of the side walls being opposite of the first sides of the side walls;
   a loading system for loading objects into the hold from an access at a front of the hold, said loading system capable of moving the objects to a rear of the hold;
   props extending substantially vertically along the second sides of the side walls, the props resting on a primary structure of the aircraft for supporting the floor;
   a holding device for the objects;
   a flexible wall and at least one winding mechanism, wherein the flexible wall is mounted on the winding mechanism so as to be able to be either rolled up on the winding mechanism, or unrolled; and
   hooking means provided on the flexible wall to cooperate with complementary means for keeping the flexible wall in an unrolled position, and
   wherein at least one winding mechanism of the flexible wall is mounted on one of the props.

2. An aircraft according to claim 1, wherein the flexible wall is a net.

3. An aircraft according to claim 1, wherein the flexible wall includes first and second flexible half-walls, the first half-wall being rolled up on a first winding mechanism and the second half-wall being rolled up on a second winding mechanism, the first and second winding mechanisms being arranged parallel to one another.

4. An aircraft according to claim 3, wherein a free end of the first flexible half-wall includes hooking means, and a free end of the second flexible half-wall includes complementary hooking means.

5. An aircraft according to claim 1, further comprising slots in the side walls facing each winding mechanism mounted on a prop to allow passage of the corresponding flexible wall.

6. An aircraft according to claim 1, further comprising a sheathing that surrounds each winding mechanism arranged on a prop so as to cover the winding mechanism and ensure a watertightness around the winding mechanism.

7. An aircraft according to claim 1, further comprising benches provided at inclined side parts of the floor.

8. An aircraft according to claim 1, wherein the loading system includes two sets of conveyor belts provided on the floor of the hold and aligned in a longitudinal direction of the aircraft.

9. An aircraft according to claim 8, wherein the two sets of conveyor belts are aligned one behind the other in the longitudinal direction of the aircraft on a central part of the floor of the hold, and a row of rollers of a freight loading system is provided between the two sets of conveyor belts.

10. An aircraft according to claim 1, wherein the loading system includes a freight loading system comprising rollers on which objects moving the hold slide.

11. An aircraft according to claim 1, wherein the access includes a baggage door and a container door.

12. An aircraft according to claim 11, wherein the container door allows passage of a standard type LD3 container.

* * * * *